United States Patent [19]
Deutsch et al.

[11] Patent Number: 5,806,290
[45] Date of Patent: Sep. 15, 1998

[54] HIGH CAPACITY COTTON HARVESTER

[75] Inventors: Timothy Arthur Deutsch, Newton; Russell Dean Copley; Joel Marvin Schreiner, both of Ankeny, all of Iowa; Wendell Dean Vardeman, Slaton, Tex.; Raymond Dean Vardeman, Slaton, Tex.; Wendell Keith Vardeman, Slaton, Tex.

[73] Assignee: Deere & Company, Moline, Ill.

[21] Appl. No.: 713,269

[22] Filed: Sep. 13, 1996

[51] Int. Cl.⁶ .................................................. A01D 46/08
[52] U.S. Cl. ............................................ 56/32; 56/DIG. 8
[58] Field of Search ............................... 56/13.3, 28, 31, 56/32, 30, 37, DIG. 8

[56] References Cited

U.S. PATENT DOCUMENTS

| | | | |
|---|---|---|---|
| 4,271,659 | 6/1981 | McConnell | 56/13.3 |
| 4,344,271 | 8/1982 | Schlueter . | |
| 4,606,177 | 8/1986 | Schlueter | 56/30 |
| 4,630,431 | 12/1986 | Schlueter et al. | 56/28 |
| 5,394,679 | 3/1995 | Schlueter | 56/30 |
| 5,406,779 | 4/1995 | Deutsch | 56/32 |

FOREIGN PATENT DOCUMENTS

| | | | |
|---|---|---|---|
| 473494 | 10/1975 | U.S.S.R. | 56/28 |
| 635914 | 12/1978 | U.S.S.R. | 56/30 |

OTHER PUBLICATIONS

Deere & Co., brochure entitled "Cotton Strippers—John Deere 7445 Cotton Stripper", 8 pages, dated Mar. 1994, published in the U.S.A.

Primary Examiner—Michael J. Carone
Assistant Examiner—Christopher J. Novosad

[57] ABSTRACT

A cotton harvester includes up to eight or more brush type row units mounted on a cross auger system having a split cross auger structure with two auger portions for moving material inwardly toward a central location. Cotton is conveyed through the rear of the central location into two separation chambers, one for each auger portion, and into the lower portions of two corresponding conveying ducts which extend upwardly and outwardly at bend locations located just above the rockshaft and below the cab floor. Each duct includes a nozzle directing air upwardly above the bend location so that cotton is sucked into the bend. The ducts extend upwardly at an angle to the vertical direction and include uppermost sections extending rearwardly over the input sections of the two cleaners. The uppermost sections are angled from the horizontal and distribute the cotton evenly over cleaner inlets. A special slip joint with a hinged door on the duct structure permits a greater vertical range of vertical cross auger motion than with previously available devices for better ground clearance and better automatic ground following ability. The cleaners include outermost drives located near operator platforms which extend from the centrally located cab. Drive shield structure is movable to an access position and effectively extends the width of the platforms for maintenance, inspection and repair. A variable speed hydraulic drive is connected to a transverse shaft which in turn is connected at its ends by belts to the outermost drives on the cleaners.

29 Claims, 4 Drawing Sheets

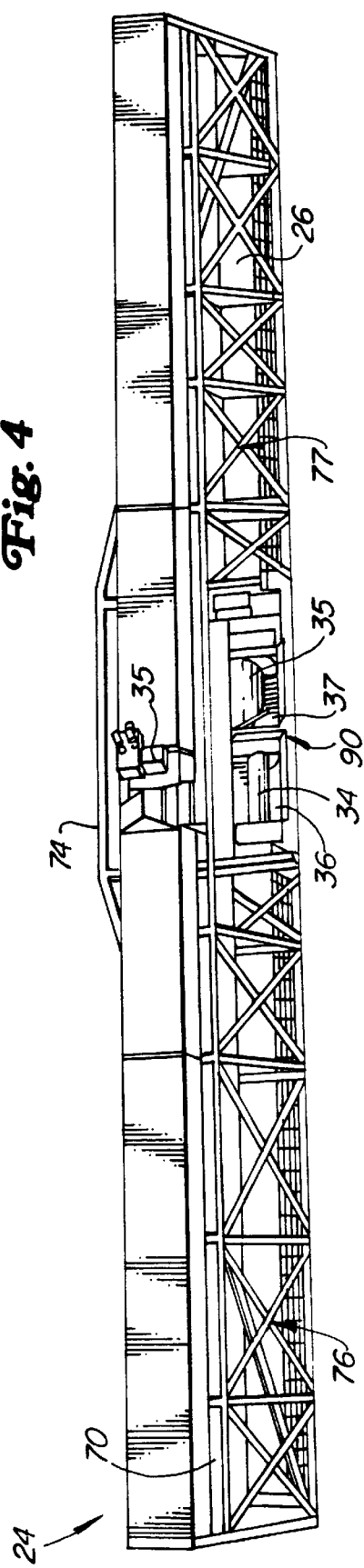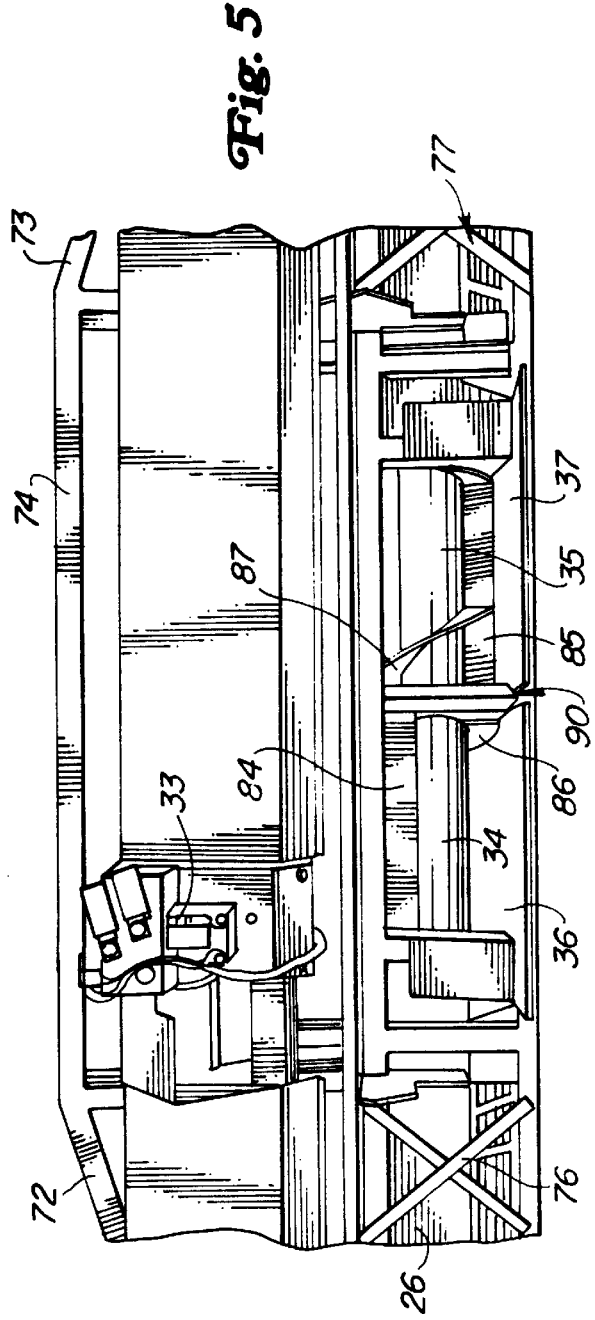

5,806,290

HIGH CAPACITY COTTON HARVESTER

BACKGROUND OF THE INVENTION

1) Field of the Invention

The present invention relates generally to cotton harvesters and, more specifically, to cotton harvesters able to harvest a large number of rows in a single pass.

2) Related Art

Cotton harvesters, such as the commercially available John Deere 7445 Cotton Stripper having brush type row units, can harvest up to four widely spaced rows of cotton or six narrowly spaced rows of cotton. A cross auger supported from the front of the frame of the harvester supports stripper row units in a variety of configurations to match numerous row spacings. At the center of the cross auger, cotton is sucked upwardly in a separation chamber by a vacuum created by a fan blowing air into nozzle above the chamber. Cotton is propelled through a single duct which extends upwardly behind the harvester cab and forwardly of a cleaner or bur extractor mounted on the harvester frame. Such a cleaner with bypass grate and door control structure is shown, for example, in U.S. Pat. No. 4,606,177.

Increasing the capacity of a harvester such as the 7445 Stripper beyond six rows of narrowly spaced cotton presents numerous problems. Moving a large volume of stripped cotton and plant material heavily taxes the conveying system so that maintaining a reliable flow through the auger, separation chamber and duct is a continuing source of difficulty. A large volume of air is required to move the material through the separation chamber and upwardly toward the cleaner, and efficiency of the air system is reduced by changes in direction of air flow between the fan outlet and the nozzle on the duct. Although improvements in cleaner design have resulted in increased cleaning capacity, the cleaner often is unable to handle the volume of material received from more than six row units operating in high yield cotton unless the harvester ground speed is reduced. If the cleaner or bur extractor is widened for increased capacity, larger and heavier cleaner drums and shafts are required which add to the weight and cost of the machine and raise the center of gravity of the harvester. Providing space on existing harvesters for the equipment necessary for adequate conveying and cleaning capacity for more than six rows of cotton, providing accessible drive for such equipment, and providing sufficient vertical range necessary for ground clearance and good ground-following ability with a wide cross auger have also been problems.

BRIEF SUMMARY OF THE INVENTION

It is therefore an object of the present invention to provide an improved cotton harvester which overcomes most or all of the aforementioned limitations. It is still another object to provide such a harvester which has a capacity greater than six rows.

It is another object of the present invention to provide an improved cotton harvester of the stripper or brush type. It is another object to provide such a harvester which has eight row or greater capacity and improved productivity. It is still another object to provide such a harvester with improved cotton conveying and cleaning capacity and improved cotton distribution within the ducts and cleaning structure. It is yet another object to provide such a harvester which utilizes conventional cleaner units to reduce weight, parts counts and costs.

It is a further object of the present invention to provide an improved cotton harvester having a cotton conveying system with capacity that is substantially greater than the capacity of previously available machines. It is another object to provide such a harvester which has a split conveying system with improved cotton conveying capacity and improved cotton distribution into the cleaning structure. It is still another object to provide such harvester that also includes dual cleaners. It is yet another object to provide such a harvester with an improved drive system for the cleaners.

It is yet another object of the present invention to provide a high capacity cotton harvester having an improved chassis and cotton conveying arrangement. It is a further object to provide such a harvester with improved cotton cleaning structure, including an adjustable cotton cleaner drive. It is still another object to provide such a method and structure wherein a brush type of harvester is constructed from a modified spindle type chassis.

A cotton harvester constructed in accordance with the teachings of the present invention includes as many as eight or more brush type row units mounted on a cross auger system having a split cross auger structure with two auger portions for moving material inwardly toward a central location. Cotton is sucked through the rear of the central location into two separation chambers, one for each auger portion, and into the lower portions of two corresponding conveying ducts which extend upwardly and outwardly at bend locations located just above the rockshaft and below the cab floor. Each duct includes a nozzle directing air upwardly above the bend location so that cotton is sucked into the bend for better distribution in the duct. The ducts extend upwardly at an angle to the vertical direction and include uppermost sections extending rearwardly over the input sections of the two cleaners. The uppermost sections are angled from the horizontal and distribute the cotton evenly over cleaner inlets. A special slip joint with a hinged door on the duct structure permits a greater vertical range of vertical cross auger motion than with previously available devices for better ground clearance and better automatic ground following ability. The two cleaners are lighter than a single large cleaner for improved stability, reduced parts inventory, and lower cost. The two ducts and two cleaners also eliminate problems associated with conveying large volumes of cotton and distributing the cotton across the width of the cleaning structure.

The cleaners include outermost drives located near operator platforms which extend outwardly from the centrally located cab. Drive shield structure is movable to an access position and effectively extends the width of the platforms for maintenance, inspection and repair. A variable speed hydraulic drive is connected to a transverse shaft which in turn is connected at its ends by belts to the outermost drives on the cleaners.

The harvester can be constructed as a brush type cotton harvester utilizing a slightly modified spindle type cotton picker chassis to further reduce necessary parts inventory and decrease manufacturing costs. The arrangement of components on the picker chassis including the transverse engine, central fan configuration with forward outlet, and rearwardly extended frame and basket provide advantageous weight and space allocation, efficient air flow, and good drive accessibility. The unique dual conveying system with angled ducts and the dual cleaning system configuration increases productivity, efficiency and reliability, and reduces weight and distribution problems associated with larger ducts and a single large cleaner. The system further enhances accessibility for inspection, maintenance and repair.

These and other objects, features and advantages of the present invention will become apparent to one skilled in the art upon reading the following detailed description in view of the drawings.

BRIEF DESCRIPTION OF THE DRAWINGS

FIG. 4 is rear view of the cross auger structure of the harvester of FIG. 1.

FIG. 5 is an enlarged view of the rear central portion of the cross auger structure of FIG. 4.

DETAILED DESCRIPTION OF THE DRAWINGS

Figure 1:
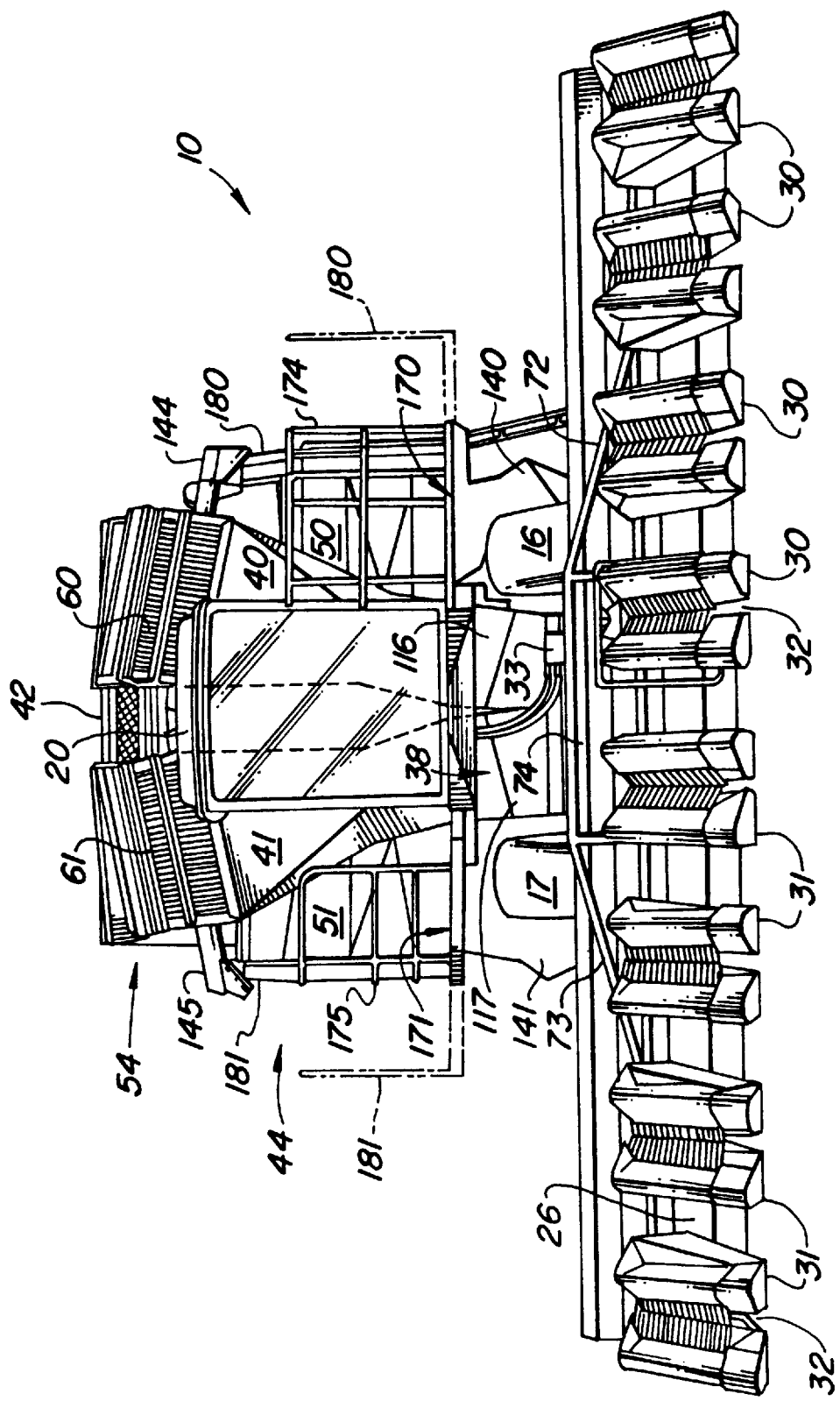
FIG. 1 is a front view of a cotton harvester having eight brush type row units.
Figure 2:
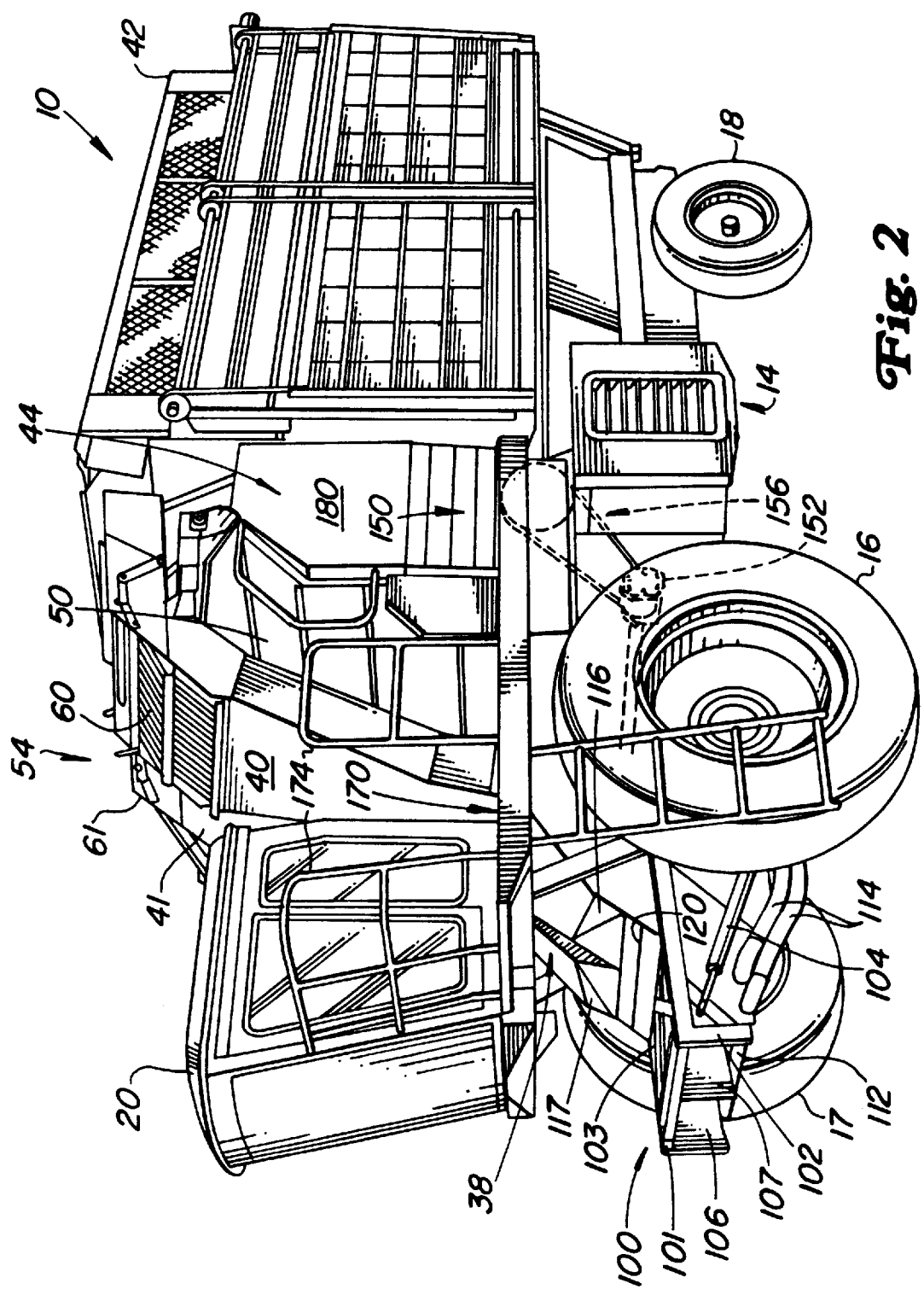
FIG. 2 is a front perspective view of the harvester of FIG. 1 with parts removed to better show the separation chambers and ducts.

Referring now to FIGS. 1 and 2, therein is shown a cotton harvester 10 having a fore-and-aft extending main frame 12 and supporting transverse mounted engine structure 14. The frame 12 is supported above the ground by forward drive wheels 16 and 17 and rear steerable wheels 18. A cab 20 is supported at the forward end of the frame 12 and cross auger structure 24 including an auger housing 26 is adjustably supported for vertical movement relative to the frame forwardly and below the cab 20. The chassis arrangement is generally similar to that shown and described in U.S. Pat. No. 5,406,779 of common ownership with the present application; however, the frame 12 is extended on the order of forty-nine inches (1.24 meters) to provide additional space behind the cab 20.

A plurality of brush type or stripper row units 30 and 31 are connected to the left and right hand sides, respectively (as viewed in the direction of travel), of cross auger structure 24, and each unit 30 and 31 includes a row-receiving area 32 with conventional counter-rotating brush structure driven by a hydraulic drive 33 for removing cotton plant material including cotton burrs and cotton fibers from a row of plants. The removed material is conveyed rearwardly by augers in the units to the cross auger structure 24 which includes left and right hand augers 34 and 35 (FIGS. 4 and 5) with opposite flighting to move the removed material inwardly towards central locations 36 and 37 opening rearwardly in the auger housing 26 below the front of the cab 20. Duct structure indicated generally at 38 includes first and second individual ducts 40 and 41 which extend upwardly and diverge outwardly from the respective central locations 36 and 37 towards a cotton receptacle or basket 42 supported on the aft end of the frame 12. The ducts 40 and 41 are substantially mirror images of each other and have generally rectangular cross section that widens and decreases in depth in the upward direction.

Cleaner or burr extracting structure 44 is supported from the frame 12 behind the cab 20 and between the duct structure 38 and the forward end of the basket 42. The cleaner structure 44 includes first and second cleaners 50 and 51 supported side-by-side and having a combined mounted width approximately equal to the width of the basket 42. Each of cleaners 50 and 51 opens upwardly, and material directing structure 54 including first and second bypass grate and door assemblies 60 and 61 located at the top of the duct structure 38 at the upper ends of the ducts 41 and 42 selectively directs the harvested material downwardly into the cleaner structure 44 or rearwardly through upper openings in the forward end of the basket 42. The cleaner structure 44 removes burrs and other plant material from the lint cotton and directs the cleaned material upwardly towards the structure 54 and then rearwardly into the basket 42. Preferably each of the cleaners 50 and 51 and the bypass grate and door assemblies 60 and 61 are generally of the type shown and described in U.S. Pat. No. 4,606,177 of common ownership with the present application; however, the top of the ducts 41 and 42 and the assemblies 60 and 61 are angled with respect to the horizontal to better distribute material to be cleaned across the structure 44, as described in detail below. The cleaner drive, described in detail below, is also modified.

The cross auger structure 24 (FIGS. 1 and 4–5) includes a relatively wide auger frame 70 having forward diagonal brace structures 72 and 73 and aft cross brace structures 76 and 77 extending outwardly from a center frame member 74. As shown, the auger structure 24 can support up to eight row units 30 and 31 for widely spaced cotton, or ten of the row units for narrowly spaced cotton. The row units 30 and 31 are preferably the type exemplified by the units on the commercially available John Deere model 7445 Cotton Stripper.

The augers 34 and 35 have innermost paddle portions 84 and 85 with small sections of reverse flighting 86 and 87, respectively, to help propel removed plant material rearwardly through the corresponding central locations 36 and 37 and direct the material towards the center of the openings. A central divider 90 generally in the form a V-shaped panel separates the left and right augers 34 and 35 and assures that cotton from the left row units 30 and left auger 34 travels exclusively to the left duct 40 and the left bypass grate and door assembly 60, and cotton from the right row units 31 and right auger 35 travels exclusively to the right duct 41 and the right assembly 61.

The central portion of the cross auger frame 70 is releasibly connected to a lift frame 100 (FIG. 2) so that the cross auger structure 24, if necessary, can be removed from the harvester 10 for endwise transport. The lift frame 100 includes L-shaped side arms 101 and 102 are connected by upper cross brace structure 103 and extend rearwardly to connections with a transversely extending rockshaft (not shown) below the cab and above the drive axle for the front wheels 16 and 17. A pair of lift cylinders 104 are connected between the forward end of the main frame 12 and the side arms of the lift frame 100 to provide cross auger structure height control and lift functions.

First and second green boll separation chambers 106 and 107 which open in the forward direction into the openings at 36 and 37, respectively, include a center divider panel 110 which forms a rearward extension of the central auger divider 90 and assures that cotton from the left auger 34 has a direct path to the left duct 40 and cotton from right auger 35 has a direct path to the right duct 41. The chambers 106 and 107 open downwardly to allow heavier, undesirable material such as green bolls to drop from the stream of conveyed material while lighter material including the ripe cotton is floated rearwardly into the lower ends of the ducts 40 and 41. Each of the chambers includes a pair of air tubes 112 connected by flexible air tubes 114 to a source of air. The tubes open upwardly and rearwardly to provide an air flow that helps propel the lighter material rearwardly over the lower openings.

Figure 3:
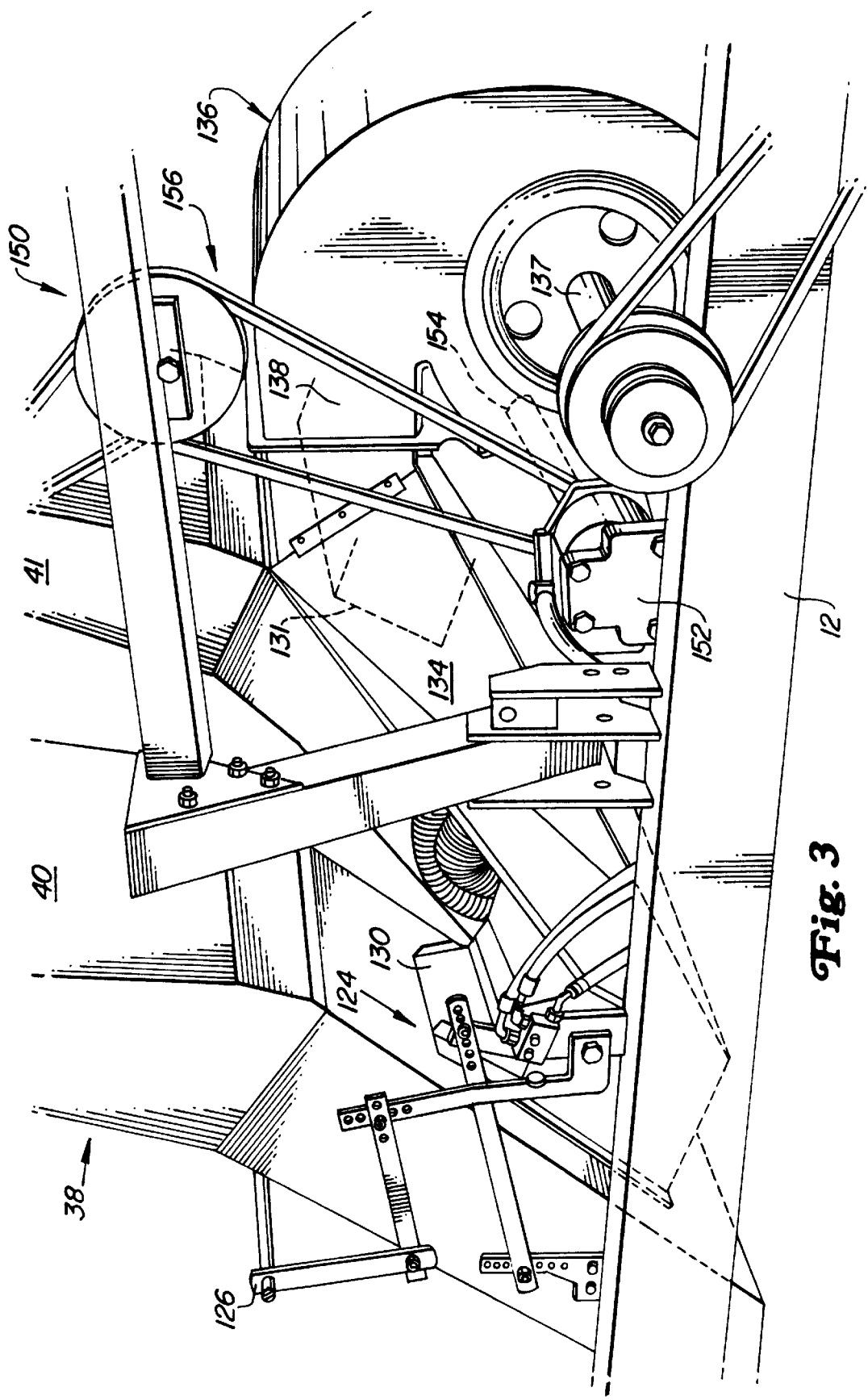
FIG. 3 is an enlarged perspective view of a portion of the left side of the harvester of FIGS. 1 and 2 showing portions of the air system and cleaner drive.

The lower ends of the ducts 40 and 41 are connected to the aft ends of the separation chambers 106 and 107, respectively, and begin to angle outwardly at bend locations 116 and 117 above a hinged slip joint 120 at the juncture of the ducts 40 and 41. The joint 120 permits the lift frame 100 to have a substantial vertical range of positions for better row unit height control and a higher transport position than has typically been available with previously available harvester. The slip joint 120 allows the lowermost portion of the duct structure 38 and the chambers to move relative to the portion of the duct structure above the slip joint. A down stop limit assembly indicated at 124 in FIG. 3 is connected between the cylinders 104 and a source of hydraulic fluid under pressure on the harvester to set a lower limit on the auger structure position. Linkage 126 is connected between the limit assembly 124 and an adjustable control (not shown) in the cab so the operator can set the lowermost position depending on field conditions.

Air nozzles 130 and 131 are supported in the back walls of the ducts 40 and 41 (FIG. 3), respectively, above the bend locations 116 and 117 and are connected by air duct structure 134 to a fan 136 centrally located on the frame 12 behind the cab 20. The fan 136 includes a transverse drive shaft 137 and a forwardly facing fan outlet 138 centrally located behind the ducts 40 and 41. The forwardly facing fan outlet 138 with the connecting duct structure 134 provides a forwardly and downwardly directed non-tortious air path having maximum bend angles of substantially less than 90 degrees between the outlet 138 and the outputs of the nozzles 130 and 131 for maximizing air flow efficiency. The nozzles 130 and 131 direct air upwardly in the ducts and induce an vacuum at the lower ends of the ducts to draw material from the separation chambers 106 and 107 through the ducts. The material passes the nozzles and then is propelled upwardly by the blasts of air from the nozzles to the angled bypass grate and door structures 60 and 61, which when the cleaning positions are selected, direct the material uniformly across the inputs to the first and second cleaners 50 and 51, respectively. Burrs and other unwanted material are removed from the cotton in the cleaners, and the removed material exits the cleaners via burr chutes 140 and 141 (FIG. 1). The cleaned cotton is directed upwardly along the back sides of the cleaners and then rearwardly into the basket 42. The structures 60 and 61 may be moved to a bypass position wherein harvested material bypasses the cleaner and is blown directly into the basket 42. Augers 144 and 145 convey green bolls and other undesirable dense materials that drop from lower openings in the structures 60 and 61 upstream of the cleaner inputs. The augers 144 and 145 extend outwardly towards opposite sides of the harvester.

The cleaners 50 and 51 include outer drives 150 located adjacent each side of the harvester 10. The drives 150 are powered by a variable speed hydraulic motor 152 (FIGS. 1 and 3) supported at the left side of the main frame 12. The motor 152 is connected to a transversely extending drive shaft 154 which in turn is connected through belt drives 156 at the sides of the harvester to the cleaner drives 150. The speed of the cleaners 50 and 51 can be adjusted by varying the speed of the motor 152 to optimize cleaner productivity for different crop conditions and harvesting speeds.

Platforms 170 and 171 extend outwardly on opposite sides of the cab 20 and rearwardly to the cleaners 50 and 51 for convenient access by the operator. Railings 174 and 175 extend upwardly from the forward and outer portions of the respective platforms 170 and 171. Combination platform and shield structure indicated generally at 180 and 181 is shown by the solid lines in FIG. 1 in the shielding position wherein the drives 150 on each side of the harvester are covered. The shield structure 180 and 181 is preferably of the type shown and described in U.S. Pat. No. 4,630,431, of common ownership with the present application. Each of the structures 170 and 171 can be rocked to an access position (broken lines of FIG. 1) wherein a temporary railed platform is defined for convenient access to the side drives 150. The temporary platform extends the platforms 170 and 171 outwardly and rearwardly along side of the cleaners 50 and 51.

Having described the preferred embodiment, it will become apparent that various modifications can be made without departing from the scope of the invention as defined in the accompanying claims.

We claim:

1. In a cotton harvester having a fore-and-aft extending main frame supported for forward movement over a field planted in parallel rows of cotton plants, a cab supported on the forward end of the main frame, a fore-and-aft extending cotton receptacle supported on the frame behind the cab, an engine mounted behind the cab for driving the harvester, cotton conveying structure comprising:

a cross auger mounted on the forward end of the main frame and supporting a plurality of row units for removing cotton from the rows of cotton plants, the cross auger including first and second auger portions for moving cotton toward a central location on the cross auger;

first and second ducts extending rearwardly from the central location and opening into the cross auger for receiving cotton from the first and second auger portions, the first and second ducts diverging outwardly in the upward direction from the central location and extending upwardly to an uppermost location forwardly of the cotton receptacle; and nozzle structure located in the first and second ducts and connected to a source of air on the harvester for inducing cotton flow from the central location and propelling cotton towards the receptacle.

2. The cotton conveying structure as set forth in claim 1 including cotton cleaner structure supported behind the cab and forwardly of the receptacle, and wherein the first and second ducts include uppermost portions angled with respect to the horizontal and opening into the cleaner structure.

3. The cotton conveying structure as set forth in claim 1 including first and second upright cotton cleaners supported in side-by-side relationship rearwardly of the cab and forwardly of the receptacle, and wherein the first and second ducts have upper portions opening into upper sections of the first and second cotton cleaners respectively.

4. The cotton conveying structure as set forth in claim 3 wherein the first and second ducts angle outwardly in the upward direction to the upper portions, and the upper portions are angled with respect the horizontal to spread cotton into the first and second cleaners.

5. The cotton conveying structure as set forth in claim 3 further comprising an adjustable speed drive connected to the first and second cleaners for driving the cleaners at a variable speed.

6. The cotton conveying structure as set forth in claim 5 wherein the adjustable speed drive includes a drive shaft extending transversely between the cleaners and connected to a hydraulic motor.

7. The cotton conveying structure as set forth in claim 3 wherein the cotton cleaners have adjacent inwardly located sides and outward sides, and include first and second cleaner unit drive structure located at the outward sides.

8. The cotton conveying structure as set forth in claim 1 wherein the engine is mounted transversely to the forward direction, an engine-driven fan supported behind the first and second ducts and forwardly of the engine, the fan having an outlet opening in the forward direction into the nozzle structure.

9. The cotton conveying structure as set forth in claim 1 wherein the ducts include bend locations whereat the ducts angle outwardly, and wherein the nozzle structure provides areas of suction at the ducts, and wherein the bend locations are located in the areas of suction so that cotton is sucked into the bend locations to faciliate distribution of the cotton in the ducts above the bend locations.

10. The cotton conveying structure as set forth in claim 1 wherein the cross auger includes a divider separating the first and second auger portions and directing cotton from the first and second portions exclusively into the first and second ducts respectively.

11. The cotton conveying structure as set forth in claim 10 including first and second green boll separation chambers located between the cross auger portions and the first and second ducts, respectively.

12. In a cotton harvester having a fore-and-aft extending main frame supported for forward movement over a field planted in parallel rows of cotton plants, a cab supported on the forward end of the main frame, a fore-and-aft extending cotton receptacle supported on the frame behind the cab, an engine mounted behind the cab for driving the harvester, cotton conveying structure comprising:

a cross auger having a central discharge location and mounted on the forward end of the main frame;

a plurality of row units supported on the cross auger for removing cotton from the rows of cotton plants;

duct structure extending rearwardly from the central discharge location and opening into the cross auger for receiving cotton from the cross auger, the duct structure including first and second ducts supported side-by-side behind the cab and angling outwardly in the upward direction from the central location, the first and second ducts extending upwardly to a location forwardly of the cotton receptacle; and an air system including nozzle structure connected to the duct structure for inducing cotton flow from the central location and propelling cotton towards the receptacle.

13. The cotton conveying structure as set forth in claim 12 wherein the cross auger includes first and second auger portions for moving cotton toward the central discharge location, and divider structure directing the cotton from the first auger portion exclusively to the first duct.

14. The cotton conveying structure as set forth in claim 12 wherein the nozzle structure is connected to the first and second ducts, respectively, and to a fan having a forwardly directed output extending towards the structure and providing a generally nontortious path between the fan output and the nozzle structure.

15. The cotton conveying structure as set forth in claim 12 wherein the duct structure includes bend locations above the central discharge location and below the nozzle structure, the first and second ducts extending outwardly at the bend locations into upper duct sections, the nozzle structure providing an area of suction adjacent the bend locations for even distribution of cotton in the upper duct sections.

16. The cotton conveying structure as set forth in claim 15 wherein the upper duct sections include uppermost portions angled with respect to the horizontal.

17. The cotton conveying structure as set forth in claim 16 wherein the uppermost portions open downwardly, and further including cleaning structure located below the uppermost portions and receiving cotton from the upper duct sections.

18. The cotton conveying structure as set forth in claim 17 wherein the cotton cleaning structure includes first and second cotton cleaners located behind the cab.

19. The cotton conveying structure as set forth in claim 17 wherein the cross auger includes first and second auger portions for moving cotton toward the central discharge location, and divider structure directing the cotton from the first auger portion exclusively to the first duct and first cotton cleaner and cotton from the second auger portion exclusively to the second duct and second cotton cleaner.

20. The cotton conveying structure as set forth in claim 12 further including a slip joint located between the central discharge location and the duct structure, and lift structure connected to the cross auger for raising and lowering the row units between raised transport and lowered field-working positions, the slip joint facilitating lifting of the cross auger for increased clearance between the row units and ground.

21. A cotton harvester comprising:

a fore-and-aft extending main frame supported for forward movement over a field of cotton plants;

a cab supported on the frame;

a basket supported behind the cab;

a transversely extending cross auger structure supported for vertical movement at the forward end of the frame and supporting harvesting structure for removing cotton from the plants;

cotton conveying duct structure extending upwardly behind the cab and forwardly of the basket, the duct structure diverging outwardly in the upward direction to uppermost locations offset above the cab and outwardly of opposite sides the cab;

platform structure extending outwardly from both sides of the cab; and cleaning structure located between the cab and the basket and extending substantially the width of the platform structure, the cleaning structure opening into the uppermost locations of the duct structure and selectively receiving cotton to be cleaned therefrom.

22. The cotton harvester as set forth in claim 21 wherein the duct structure comprises first and second ducts diverging outwardly, relative to each other.

23. The cotton harvester as set forth in claim 22 wherein the cross auger structure includes left- and right-handed auger portions terminating at a center location, divider structure separating the auger portions and directing cotton from the left-handed auger portion exclusively to the first duct and cotton from the right-hand auger exclusively to the second duct.

24. The cotton harvester as set forth in claim 23 including first and second green boll separating chambers connecting the first and second ducts with the first and second auger portions, respectively.

25. The cotton harvester as set forth in claim 22 wherein the uppermost locations of the ducts are angled downwardly in the outward direction for distributing the cotton into the cleaning structure.

26. The cotton harvester as set forth in claim 21 wherein the cleaning structure comprises first and second adjacent cleaners supported in side-by-side relationship.

27. The cotton harvester as set forth in claim 26 further comprising first and second drives connected to outmost sided of the respective first and second cleaners, and a drive shield connected to each of the outmost sides of the cleaners, the drive shields movable between shielding positions covering the drives and platform positions effectively extending the width of the platform structure for facilitating access to the drive structures.

28. The cotton harvester as set forth in claim 26 further comprising a variable speed drive connected to the first and second cleaners for driving the cleaners at an adjustable speed.

29. The cotton harvester as set forth in claim 28 wherein the variable speed drive comprises a hydraulic motor and a transversely extending shaft connected to the motor and extending substantially between the outmost sides of the cleaners.

* * * * *